(12) United States Patent
Rempel

(10) Patent No.: US 12,185,860 B2
(45) Date of Patent: Jan. 7, 2025

(54) SLEEVE FOR A FRUIT SQUEEZER

(71) Applicant: Elsie Rempel, Canyon, TX (US)

(72) Inventor: Elsie Rempel, Canyon, TX (US)

( * ) Notice: Subject to any disclaimer, the term of this patent is extended or adjusted under 35 U.S.C. 154(b) by 743 days.

(21) Appl. No.: 17/403,140

(22) Filed: Aug. 16, 2021

(65) Prior Publication Data

US 2021/0401214 A1 Dec. 30, 2021

Related U.S. Application Data

(60) Provisional application No. 63/140,215, filed on Jan. 21, 2021.

(51) Int. Cl.
*A47J 19/02* (2006.01)

(52) U.S. Cl.
CPC .................. *A47J 19/023* (2018.08)

(58) Field of Classification Search
CPC ......... A47J 19/023; A47J 19/005; A47J 19/02
USPC .......................................................... 99/495
See application file for complete search history.

(56) References Cited

U.S. PATENT DOCUMENTS 1,542,322 A * 6/1925 Rollman ................. A47J 19/06
100/243
2018/0213961 A1* 8/2018 Dumler ................. A47J 19/005

* cited by examiner

*Primary Examiner* — Dana Ross
*Assistant Examiner* — James F Sims, III
(74) *Attorney, Agent, or Firm* — Barry Choobin; Patent 360

(57) ABSTRACT

A sleeve for a fruit squeezer for extracting juices from fruit without dripping the juices outside a container, and a method of use thereof. The sleeve can include a lower portion, a mid portion, and an upper portion. The upper portion has a top periphery, wherein the lower portion is narrowest and the upper portion is broadest. The sleeve can have a first substantially U-shaped cut along the top periphery that can extend within the upper portion and the mid portion. The first substantially U-shaped cut can receive the hinge joint of the fruit squeezer. The sleeve can further have a window in the mid portion opposite the first substantially U-shaped cut, wherein the window can receive the lower arm of the fruit squeezer. The sleeve can further have a second substantially U-shaped cut along the top periphery in the upper portion above the window and opposite the first substantially U-shaped cut, the second substantially U-shaped cut can receive the upper arm of the fruit squeezer.

10 Claims, 7 Drawing Sheets

SLEEVE FOR A FRUIT SQUEEZER

FIELD OF INVENTION

The present invention relates to a sleeve for a hand-held fluid squeezer, and more particularly, the present invention relates to a sleeve for fruit squeezers that can prevent the dripping of juices outside a container.

BACKGROUND

Fruit squeezers, also known as citrus squeezers or lemon squeezers, are known in the art as a handheld kitchen tool that can be used to squeeze the juices from citrus fruits, particularly lemon. Typically, a fruit squeezer includes a pair of elongated arms coupled at one end through a hinge joint. The upper arm can be pivoted relative to the lower arm. Near the hinged joint is provided a lower cup configured in the lower arm, the lower cup has a perforated bottom and fruit can be placed in the lower cup. An upper cup of a shape similar to the lower cup but sized to fit into the lower cup is provided in the upper arm. With the fruit in the lower cup, the upper arm can be forced downwards towards the lower arm wherein the fruit gets compressed between the upper cup and the lower cup, and the juices in the fruit can escape through the perforations. The juices can be collected in a container placed below the lower cup of the fruit squeezer.

The fruit squeezers are popular and widely used. However, the fruit squeezers in common have one major drawback. Compression of the fruit results in the dripping of the juices outside the container. Citrus juices can harm the surface over which they fall, such as a granite slab over which the container is placed.

Thus, a long-term and unsolved desire is there for an accessory that can funnel all the juices from a fruit squeezer into a containing and prevents the dripping of juices outside the container.

SUMMARY OF THE INVENTION

The following presents a simplified summary of one or more embodiments of the present invention in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to a sleeve for fruit squeezers that can prevent the dripping of juices outside a container.

It is another object of the present invention that the sleeve is easy to use.

It is still another object of the present invention that the sleeve is economical to manufacture.

In one aspect, disclosed is a sleeve for a fruit squeezer for squeezing juices from a fruit without dripping juices outside the container. A typical fruit squeezer includes an upper arm and a lower arm, each the upper arm and the lower arm has a proximal end and a distal end, the upper arm and the lower arm pivotally coupled at their proximal ends through a hinge joint, a lower cup configured in the lower arm near the hinge joint, an upper cup configured in the upper arm near the hinge joint, wherein the upper cup dimensioned to fit into the lower cup, near the distal end of the upper arm configured as an upper handle, and near the distal end of the lower arm configured as a lower handle, the lower cup has perforations for the juices to escape.

In one aspect, the sleeve can include a lower portion, a mid portion, and an upper portion. The upper portion has a top periphery, wherein the lower portion is narrowest and the upper portion is broadest. The sleeve can have a first substantially U-shaped cut along the top periphery that can extend within the upper portion and the mid portion. The first substantially U-shaped cut can receive the hinge joint of the fruit squeezer. The sleeve can further have a window in the mid portion opposite the first substantially U-shaped cut, wherein the window can receive the lower arm of the fruit squeezer. The sleeve can further have a second substantially U-shaped cut along the top periphery in the upper portion above the window and opposite the first substantially U-shaped cut, the second substantially U-shaped cut can receive the upper arm of the fruit squeezer.

In one implementation of the sleeve, the lower portion of the sleeve can gradually taper outwards from bottom to top and the mid portion of the sleeve can gradually taper outwards from bottom to top.

In one implementation of the sleeve, the sleeve can further have a horizontal flange that extends from an inner surface of the upper portion and runs along the bottom of the upper portion. The horizontal flange can act as a divider between the window and the second substantially U-shaped cut in the upper portion of the sleeve.

In one aspect, the upper portion, the mid portion, and the lower portion are integral.

In one aspect, disclosed is a method for extracting juices using the fruit squeezer. The method can include one or more steps of providing the sleeve for the fruit squeezer. Thereafter, inserting the lower arm of the fruit squeezers into the window of the sleeve, such as the lower handle protrudes from the window and the hinge joint rests in the first substantially U-shaped cut. The lower portion of the sleeve can then be positioned into and/or over an opening of a container. Thereafter, fruit can be placed in the lower cup. Alternatively, the fruit can be placed in the lower cup, and then the sleeve can be positioned over the container. Once the sleeve is in position, the upper handle can be forced towards the lower handle.

These and other objects and advantages of the embodiments herein and the summary will become readily apparent from the following detailed description taken in conjunction with the accompanying drawings.

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

Figure 1:
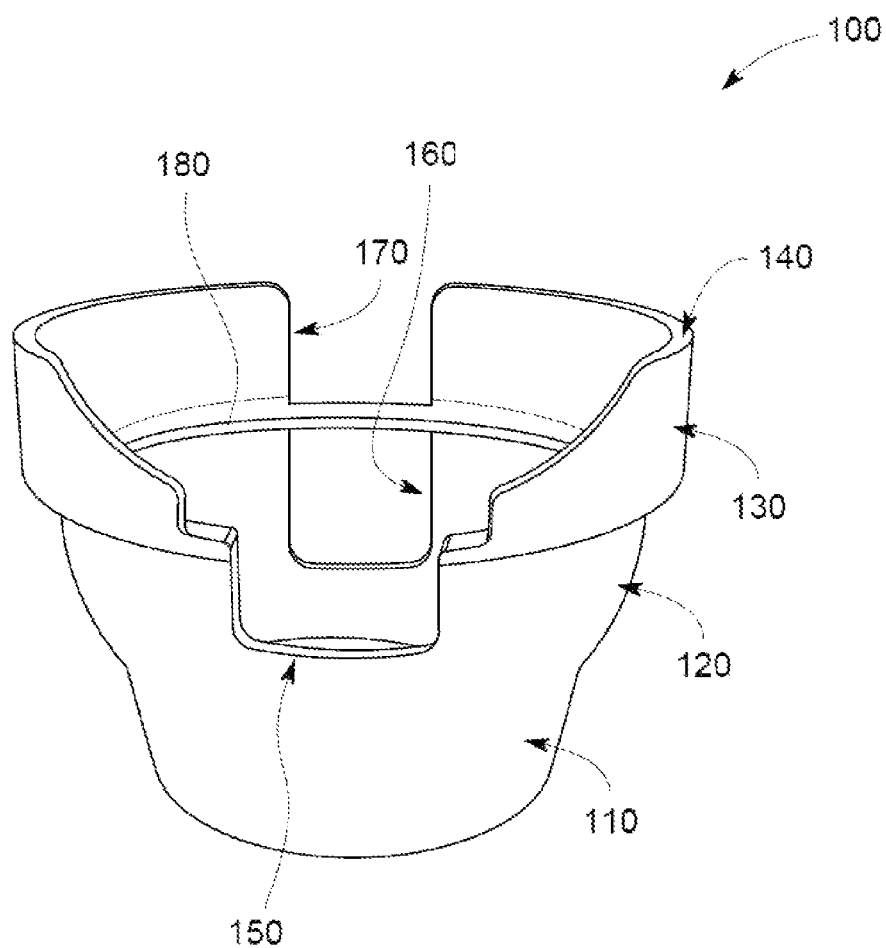
FIG. 1 is a perspective view of a sleeve for a fruit squeezer, according to an exemplary embodiment of the present invention.
Figure 2:
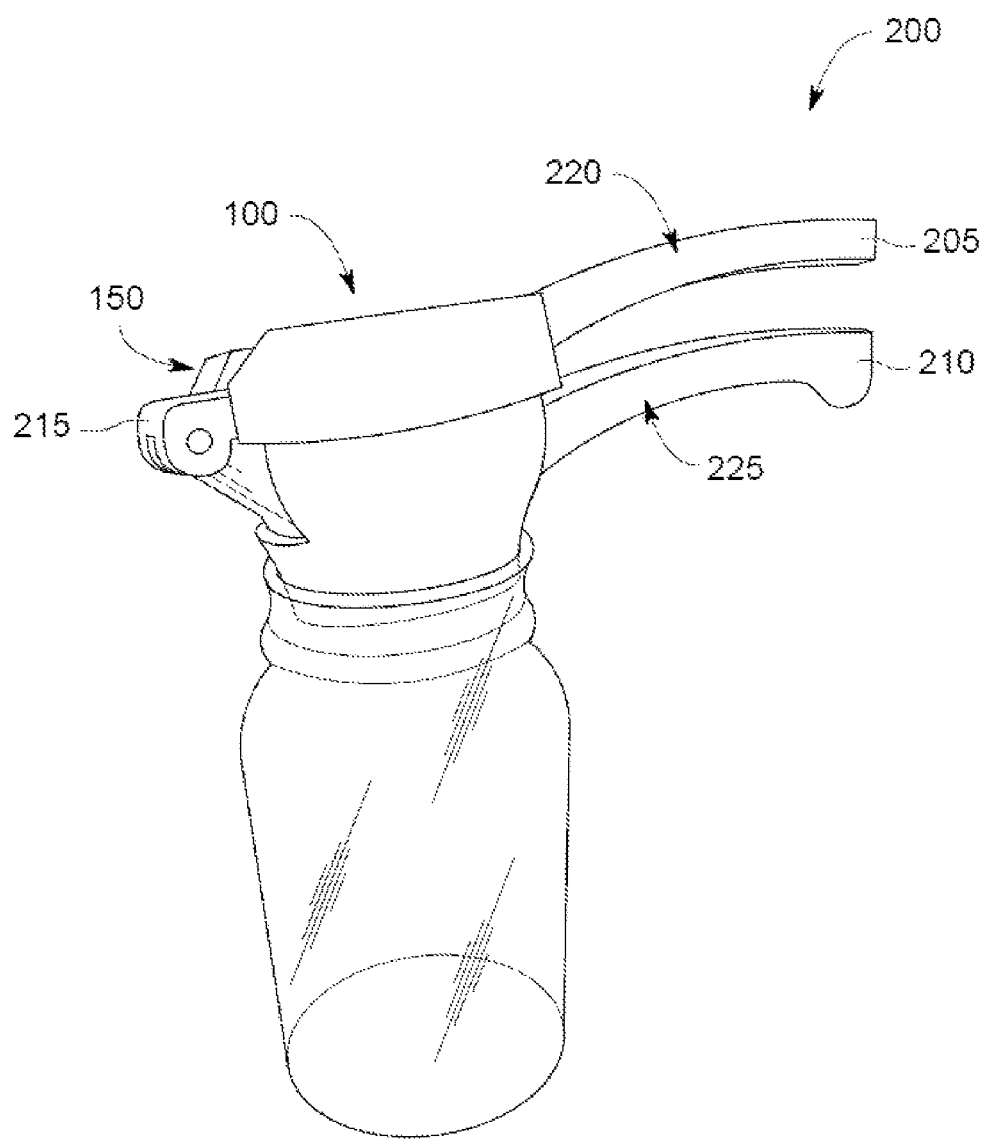
FIG. 2 shows the fruit squeezer mounted in the sleeve, according to an exemplary embodiment of the present invention.
Figure 3:
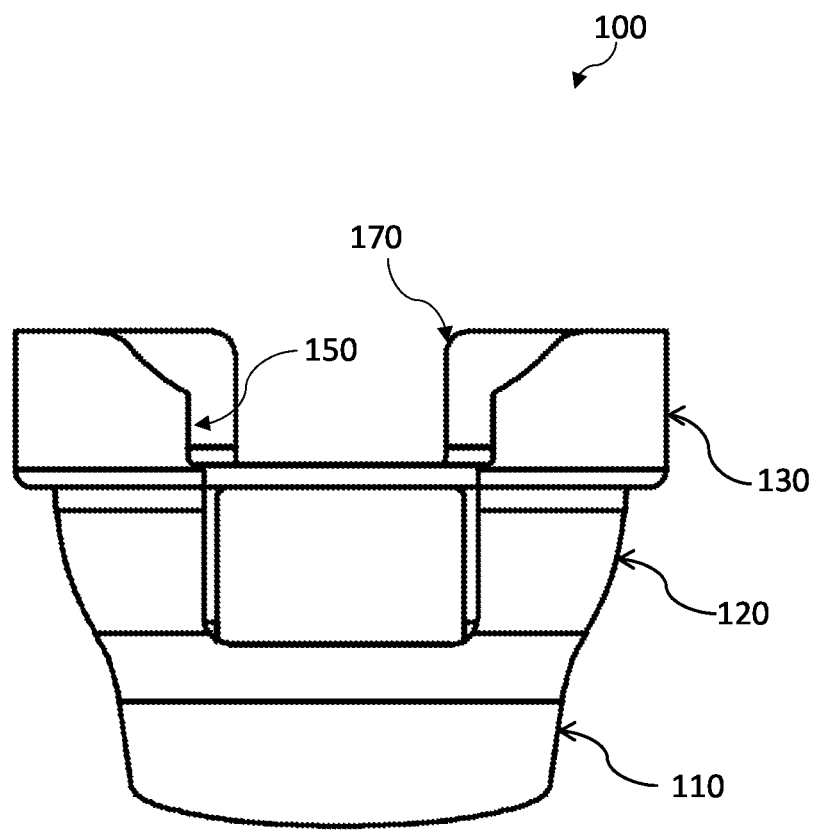
FIG. 3 is a front view of the sleeve showing a first substantially U-shaped cut, according to an exemplary embodiment of the present invention.
Figure 4:
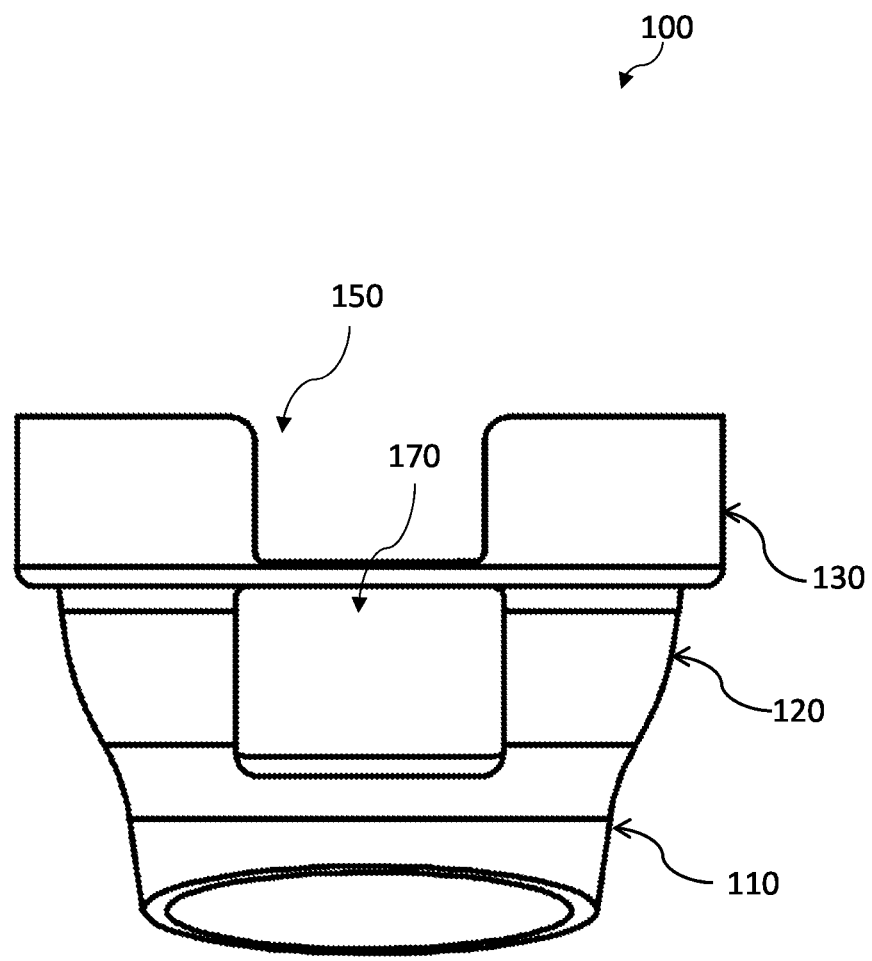
FIG. 4 is a rear view of the sleeve showing a window and a second substantially U-shaped cut, according to an exemplary embodiment of the present invention.
Figure 5:
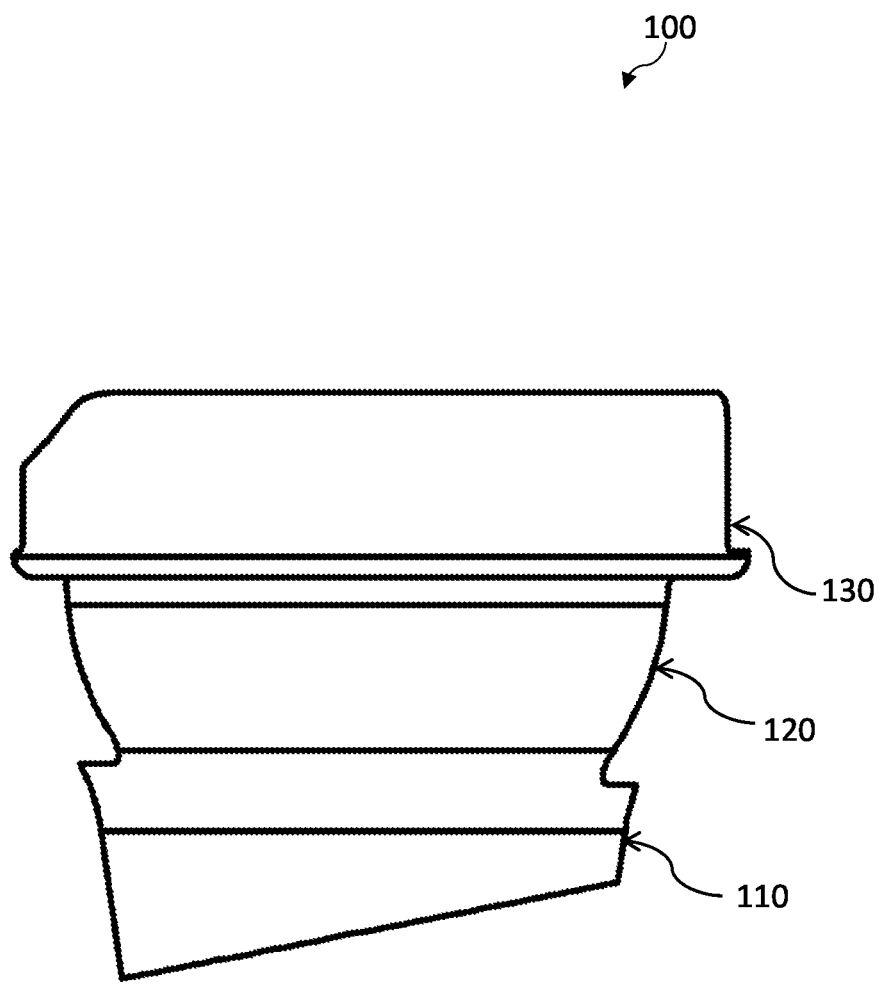
FIG. 5 is a side view of the sleeve showing a lower portion, a mid portion, and an upper portion, according to an exemplary embodiment of the present invention.
Figure 6:
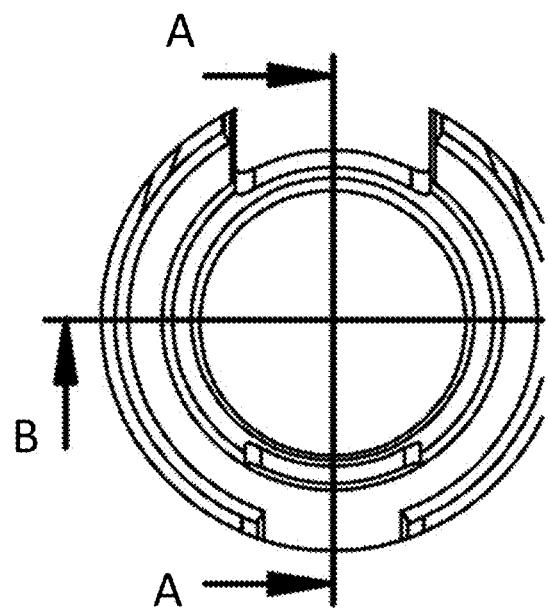
FIG. 6 is a top view of the sleeve, according to an exemplary embodiment of the present invention.
Figure 7:
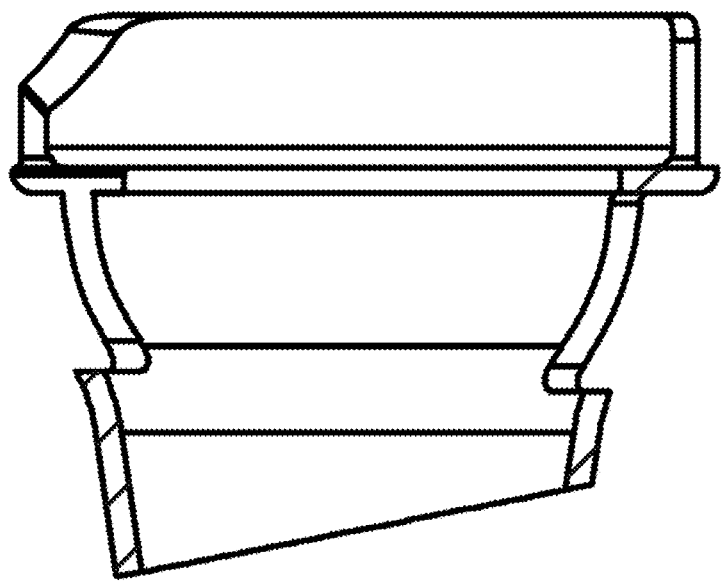
FIG. 7 is a sectional view of FIG. 6 along A-A, according to an exemplary embodiment of the present invention.
Figure 8:
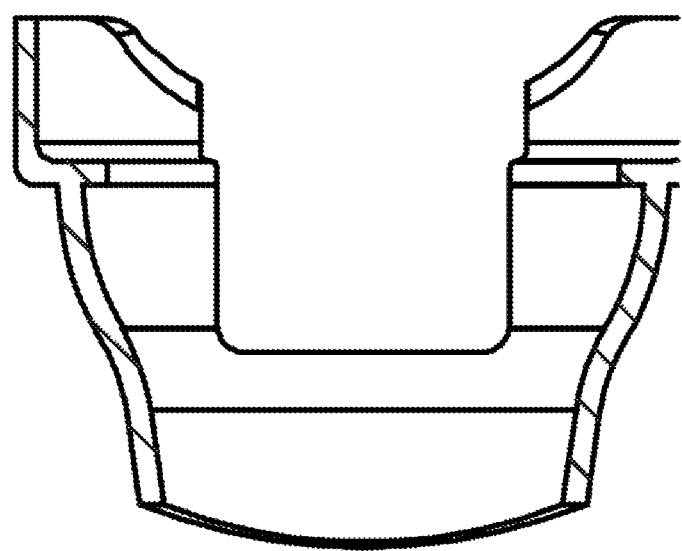
FIG. 8 is a sectional view of FIG. 6 along B-B, according to an exemplary embodiment of the present invention.

Referring to FIGS. 1-8 which shows an exemplary embodiment of the sleeve for fruit squeezers, such as lemon and orange. The disclosed sleeve can direct the squeezed juices from the fruit into a container without any chance of the juices dripping outside the container. FIG. 2 shows the fruit squeezer 200 mounted within the sleeve 100. A typical fruit squeezer 200 can include an upper arm 205 and a lower arm 210, each the upper arm and the lower arm can have a proximal end and a distal end. The upper arm 205 and the lower arm 210 can pivotally be coupled at their proximal ends through a hinge joint 215, a lower cup configured in the lower arm near the hinge joint, an upper cup configured in the upper arm near the hinge joint, wherein the upper cup dimensioned to fit into the lower cup. Near the distal end of the upper arm 205 can be configured as an upper handle 220 and near the distal end of the lower arm configured as a lower handle 225. The lower cup can be perorated for the juices to escape. It is to be understood that the structure and functioning of the fruit squeezers are known to a skilled person. The disclosed sleeve can be used with commercially available fruit squeezers same or similar to the above-described fruit squeezers.

The sleeve 100 can include a lower portion 110, a mid portion 120, and an upper portion 130. The three portions are integral and have been defined separately to illustrate one or more embodiments of the disclosed invention. The upper portion 130 has a top periphery 140 along with the opening of the sleeve. The sleeve can have a slight funnel shape, wherein the bottom of the sleeve is narrowest and the top of the sleeve is broadest. Both the lower portion and the mid portion are shown to gradually increase in diameter from bottom to top. A wall of the sleeve gradually tapers outwards from the bottom to the top. This shape of the sleeve may allow the juices to funnel into the container. The upper portion 130 of sleeve 100 is shown to be cylindrical. It is to be understood that the shape shown in FIG. 1 is preferable, however, any variations in the shape are within the scope of the present invention.

The sleeve can have a first substantially U-shaped cut 150 along the top periphery 140 that can extend within the upper portion 130 and the mid portion 120. As shown in FIG. 2, the first substantially U-shaped cut 150 can receive the hinge joint 215 of the fruit squeezer 200. The first substantially U-shaped cut as shown in FIG. 1 can be of a such as hinge joint 215 can rest in the first substantially U-shaped cut 150. The shape of the first substantially U-shaped cut 150 can correspond to the shape of the hinge joint portion of the fruit squeezer, such as the fruit squeezer can be stably retained in the first substantially U-shaped cut 150. Moreover, the shape of the first substantially U-shaped cut 150 can be such as to accommodate fruit squeezers with variable shapes.

The sleeve 100 can further have a window 160 in the mid portion 120 opposite the first substantially U-shaped cut 150. Window 160 can be a passage in a wall of the sleeve into which the lower arm 210 of the fruit squeezer 200 can be inserted, wherein the lower handle 225 of the lower arm 210 can protrude from the window 160. The window 160 can be positioned and can be of a shape and size such as the lower arm of the fruit squeezer can be retained within the window while the hinge joint can stably rest in the first substantially U-shaped cut 150. FIG. 2 shows the hinge joint 215 placed in the first substantially U-shaped cut 150 and the lower handle 225 protrudes from the window 160 in the sleeve 100.

A second substantially U-shaped cut 170 can be provided in the upper portion 130 above the window 160. The second substantially U-shaped cut 170 can receive the upper arm 205 of the fruit squeezer 200.

To extract the juices using the disclosed sleeve 100, a user can insert the lower arm of a fruit squeezer into the window of the sleeve such as the hinge joint of the fruit squeezer can rest in the first substantially U-shaped cut. Once, the fruit squeezer is in place, a fruit can be placed in the lower cup of the fruit squeezer, and thereafter, the sleeve can be positioned over a container. Once over and/or into the container the upper handle can be forced towards the lower handle to compress the fruit between the upper cup and the lower cup. The juices can pass through the perforations in the lower cup into the container, wherein the sleeve can funnel the juices into the container and prevent any chance of dripping the juices outside the container. The height of the upper portion of the sleeve can be such as to surround the upper cup. Any juice squirts from the compression can be funneled by the sleeve into the container. Thus, disclosed is a hygienic and safe method of squeezing juices using a fruit squeezer.

The disclosed sleeve can be manufactured from any food-grade material, such as silicone that is resistant to citrus juices. Moreover, the material of the sleeve may allow washing the sleeve easily preventing the accumulation or growth of microbes. Any damage to the fruit squeezer such as scratches can also be prevented. The disclosed sleeve can be manufactured in a range of sizes, designs, and shapes without departing from the scope of the present invention.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A sleeve for a fruit squeezer, the fruit squeezer comprises:
   an upper arm;
   a lower arm, each the upper arm and the lower arm has a proximal end and a distal end, the upper arm and the lower arm pivotally coupled at their proximal ends through a hinge joint;
   the lower arm comprising a lower cup, and
   the upper arm comprising an upper cup, wherein the upper cup is dimensioned to be received within the lower cup when the upper arm is pivoted towards the lower arm,
   wherein the sleeve comprises:
      a lower portion;
      a mid portion; and
      an upper portion, the upper portion has a top periphery,
   wherein the sleeve has a first substantially U-shaped cut along the top periphery in the upper portion and the mid portion, the first substantially U-shaped cut configured to receive the hinge joint of the fruit squeezer,
   wherein the sleeve further has a window in the mid portion opposite the first substantially U-shaped cut, the window configured to receive the lower arm of the fruit squeezer, and
   wherein the sleeve further has a second substantially U-shaped cut along the top periphery in the upper portion above the window and opposite the first substantially U-shaped cut, the second substantially U-shaped cut configured to receive the upper arm of the fruit squeezer.

2. The sleeve according to claim 1, wherein the lower portion of the sleeve gradually tapers outwards from bottom to top and the mid portion of the sleeve gradually tapers outwards from bottom to top.

3. The sleeve according to claim 1, wherein the sleeve further comprises a horizontal flange that extends from an inner surface of the upper portion and runs along a bottom of the upper portion.

4. The sleeve according to claim 1, wherein the upper portion, the mid portion, and the lower portion are integral.

5. The sleeve according to claim 3, wherein the horizontal flange separates the window from the second substantially U-shaped cut.

6. A method for extracting juices using a fruit squeezer, wherein the fruit squeezer comprises:
   an upper arm,
   a lower arm, each the upper arm and the lower arm has a proximal end and a distal end, the upper arm and the lower arm pivotally coupled at their proximal ends through a hinge joint,
   the lower arm comprising a lower cup, and
   the upper arm comprising an upper cup, wherein the upper cup is dimensioned to be received within the lower cup when the upper arm is pivoted towards the lower arm,
   the method comprising the steps of:
   providing a sleeve comprising:
      a lower portion,
      a mid portion, and
      an upper portion, the upper portion has a top periphery,
      wherein the sleeve has a first substantially U-shaped cut along the top periphery in the upper portion and the mid portion, the first substantially U-shaped cut configured to receive the hinge joint of the fruit squeezer,
      wherein the sleeve further has a window in the mid portion opposite the first substantially U-shaped cut, the window configured to receive the lower arm of the fruit squeezer, and
      wherein the sleeve further has a second substantially U-shaped cut along the top periphery in the upper portion above the window and opposite the first substantially U-shaped cut, the second substantially U-shaped cut configured to receive the upper arm of the fruit squeezer;
   inserting the lower arm of the fruit squeezer into the window of the sleeve, such that the lower handle protrudes from the window and the hinge joint rests in the first substantially U-shaped cut;
   positioning the lower portion of the sleeve over an opening of a container;
   placing fruit in the lower cup; and
   forcing the upper handle towards the lower handle.

7. The method according to claim 6, wherein the lower portion of the sleeve gradually tapers outwards from bottom to top and the mid portion of the sleeve gradually tapers outwards from bottom to top.

8. The method according to claim 6, wherein the sleeve further comprises a horizontal flange that extends from an inner surface of the upper portion and runs along a bottom of the upper portion.

9. The method according to claim 6, wherein the upper portion, the mid portion, and the lower portion are integral.

10. The method according to claim 8, wherein the horizontal flange separates the window from the second substantially U-shaped cut.

* * * * *